No. 781,929. Patented February 7, 1905.

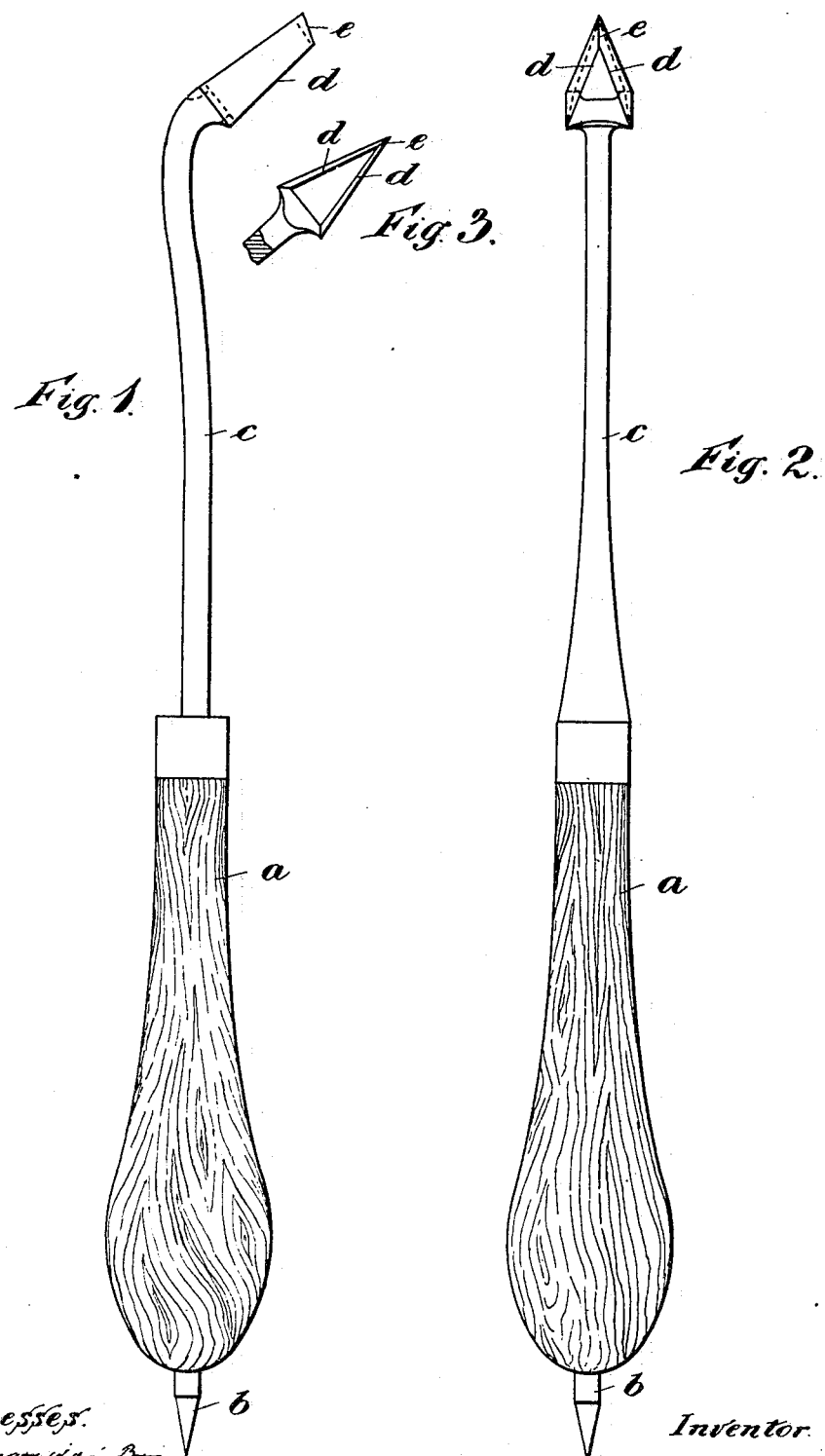

UNITED STATES PATENT OFFICE.

HUGH VILLIERS BAGOT, OF KALUTARA, CEYLON, ASSIGNOR TO EASTERN PRODUCE AND ESTATES COMPANY, LIMITED, OF LONDON, ENGLAND.

IMPLEMENT FOR TAPPING OR BLEEDING INDIA-RUBBER OR OTHER TREES.

SPECIFICATION forming part of Letters Patent No. 781,929, dated February 7, 1905.

Application filed October 25, 1904. Serial No. 229,979.

*To all whom it may concern:*

Be it known that I, HUGH VILLIERS BAGOT, a subject of the King of Great Britain, residing at Kalutara, Ceylon, have invented certain new and useful Improvements in Implements for Tapping or Bleeding India-Rubber or other Trees; and I do hereby declare the following to be a full, clear, and exact description of the invention, such as will enable others skilled in the art to which it appertains to make and use the same.

It is well known that india-rubber is the exudation of a tree, and is usually obtained by tapping or bleeding the tree by making slits, grooves, or cuts in the bark generally in a slanting direction. As the gum exudes from the tree and flows down to the lower end of each incision it is received into a small can or other vessel attached to the tree for that purpose. It is most important that the tapping or bleeding operation should be carefully and properly performed, or the health and producing properties of the tree might be affected or the tree might be killed. For example, the depth of the slits, grooves, or cuts should not be excessive, and the lower ends of two adjacent incisions should not meet or intersect, but should be stopped short before forming a complete V at the point of attachment of the collecting-can or other vessel.

The implement forming the subject of this present invention enables the tapping or bleeding operation to be performed with facility and expedition without endangering the life or health of the tree.

In the accompanying drawings, Figure 1 illustrates the implement in side elevation. Fig. 2 is a view looking from right to left in Fig. 1, and Fig. 3 is a projection of the under side of the cutting end of the implement.

$a$ is a wooden or other handle of suitable size and shape, preferably furnished at one end with a stabbing or piercing point $b$ for the purpose of making an initial incision in the bark of the tree before employing the cutting device, which is mounted in the other end of the handle $a$ and consists of a haft or stem $c$, preferably of a curved shape, as shown, its cutting end standing at an angle to the haft or stem $c$. The cutting device proper is of a hollow wedge or triangular shape, as shown, the cutting edge being at $d$ and $e$.

It has been found that this implement may be placed in the hands of natives and unskilled laborers with much less danger of the trees being damaged or killed than when knives or cutters of other known shapes are employed. It is obvious that the above-described implement is also applicable for tapping or bleeding other trees than those yielding india-rubber.

I claim—

A cutting device having a handle portion, and a cutter connected to said handle at an angle thereto, said cutter consisting of a hollow triangular-shaped piece having its side portions inclined, said side portions having cutting edges, substantially as described.

In witness whereof I have hereunto set my hand in presence of two witnesses.

HUGH VILLIERS BAGOT.

Witnesses:
 AMERATUNGAGEY WILLIAM PERERA,
 WYVILLE WOLSTAN D'ABRERA.